United States Patent Office
3,427,288
Patented Feb. 11, 1969

3,427,288
SALTS OF ETHYLENE DIAMINE TETRAACETIC ACID AS POLYCONDENSATION CATALYSTS
John A. Price, Swarthmore, and Mary J. Stewart, Media, Pa., assignors to FMC Corporation, Philadelphia, Pa., a corporation of Delaware
No Drawing. Filed Feb. 28, 1967, Ser. No. 619,184
U.S. Cl. 260—75
Int. Cl. C08g 17/003, 17/08
6 Claims

ABSTRACT OF THE DISCLOSURE

A process of preparing polyethylene terephthalate comprising carrying out a transesterification reaction between ethylene glycol and dimethyl terephthalate to form a polyester prepolymer and then polycondensing the resulting polyester prepolymer in the presence of a catalytic amount of a suitable metal salt of ethylene diamine tetraacetic acid.

---

This invention relates to a method for preparing linear polyesters.

It is known that linear polyesters can be prepared from esters of a dicarboxylic acid and a diol through the use of a two-stage process. In the first stage of this process, an ester of a dicarboxylic acid, such as dimethyl terephthalate, and a diol, such as ethylene glycol, is subjected to a transesterification reaction in the presence of a transesterification catalyst to form the corresponding diglycol terephthalate. In the second stage, the resulting diglycol terephthalate is polycondensed to form a polyester resin. When dimethyl terephthalate is the dicarboxylic acid ester used and the glycol used is ethylene glycol, the product or prepolymer of the transesterification reaction is comprised mainly of bis-2-hydroxyethyl terephthalate.

Many metals and metal compounds have been suggested heretofore for use as transesterification and polycondensation catalysts in the preparation of polyesters. However, on a study of the prior art, it is quite apparent that it is impossible to predict that any metal or metal compound will catalyze either the transesterification or polycondensation reaction, and if so, the characteristics of the resin produced. In order for a polyester resin to be satisfactory for commercial use, it is essential that the polyester resin have a suitably high melting point, a low carboxyl content value, a high molecular weight (indicated by the intrinsic viscosity) and good color. The color of the resin is particularly critical if the resin is to be used to prepare films and fibers. Some polymerization catalysts suggested by the prior art, while quite effective in the promotion of the polycondensation of polyester prepolymers, are noticeably troublesome in that they tend to produce off-color polyester resin products. For example, antimony trioxide, while being an effective polycondensation catalyst, tends to form polyester resins having noticeably greenish-white color. In general, the transesterification catalysts that are known and used do not present discoloration problems. A polyester resin reaction product exhibiting a milky-white or nearly white color indicates that such a resin product is suitable to produce films and fibers having commercially acceptable color or lack thereof. Acceptable polyester fibers usually appear white, whereas the films will be practically colorless.

It is an object of the present invention to prepare linear polyester resins by a transesterification reaction between an ester of a dicarboxylic acid and a diol in the presence of a transesterification catalyst and then a polycondensation of the resulting prepolymer in the presence of an improved polycondensation catalyst.

It is another object of the present invention to prepare polyethylene terephthalate by polycondensing bis-2-hydroxyethyl terephthalate in the presence of an improved polycondensation catalyst.

It is another object of this invention to carry out a transesterification reaction between ethylene glycol and dimethyl terephthalate in the presence of a transesterification catalyst to form a polyester prepolymer and then to polycondense the resulting polyester prepolymer in the presence of an improved polycondensation catalyst to form a polyester resin having a suitable color for commercial fiber and film production.

These and other objects are accomplished in accordance with the present invention which involves a method for preparing highly polymeric linear polyesters wherein dimethyl terephthalate is reacted with ethylene glycol in the presence of an ester-interchange catalyst to form a polyester prepolymer and where the resulting polyester prepolymer is polycondensed, the improvement comprising carrying out the polycondensation of the polyester prepolymer in the presence of a catalytic amount of a suitable metal salt of ethylene diamine teretraacetic acid.

While the present method is not to be limited to any particular suitable salt, group of salts, or degree of carboxyl substitution, the preferred salts are those formed with metals selected from the group consisting of iron and metals from Groups IA, IIB, and IVA of the Periodic Table (see Merck Index, sixth edition, inside front cover) where at least two of the hydrogen atoms of the carboxyl groups of the ethylene diamine tetraacetic acid molecule have been replaced with said metals. For example, among the polycondensation catalysts that can be used in accordance with the present invention are dilithium ethylene diamine tetraacetate, disodium lead ethylene diamine tetraacetate, disodium zinc ethylene diamine tetraacetate, and mono-ferrous ethylene diamine tetraacetate or mixture thereof.

The preparation of polyesters via the transesterification reaction is generally carried out with a molar ratio of glycol, such as ethylene glycol, to a dialkyl terephthalate, such as dimethyl terephthalate, of from about 1:1 to about 15:1, respectively, but preferably from about 1.2:1 to about 2.6:1. The transesterification reaction is generally carried out at atmospheric pressure in an inert atmosphere such as nitrogen, initially at a temperature range of from about 125° C. to about 250° C., but preferably between about 150° C. to 200° C. in the presence of a transesterification catalyst. During the first stage of this reaction, methyl alcohol is evolved and is continuously removed by distillation. After a reaction period of about 1 to 2 hours, the temperature of the reaction mixture is raised to from about 220° C. to about 300° C. for approximately one to three hours in order to complete the reaction, so as to form the desired polyester prepolymer and distill off any excess glycol.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

The polycondensation step of the present invention is accomplished by adding a suitable metal salt of ethylene diamine tetraacetic acid, as defined above, to a polyester prepolymer or bis-2-hydroxyethyl terephthalate if polyethylene terephthalate is being prepared, and heating the blend thereof under reduced pressure within the range of from about 0.05 mm. to 20 mm. of mercury while being agitated at a temperature of from about 260° C. to about 325° C. for from two to four hours. In accordance with the present invention, the subject polycondensation catalysts are employed in amounts ranging from about 0.01% to about 0.2%, based on the weight of the polyester prepolymer to be polycondensed. Usually, it has been found that from about 0.02% to about 0.1% of the subject polycondensation catalyst is preferred in most instances. Higher or lower concentrations of the present polycondensation catalysts can also be used in the subject polycondensation reaction. However, when concentrations less than the above are used, the effectiveness is generally reduced, whereas if concentrations greater than this are used, no further improvement in the present method or desired product is generally obtained.

The following examples of several preferred embodiments will further serve to illustrate the present invention. All parts are by weight unless otherwise indicated.

EXAMPLE I

A mixture comprising 600 grams of dimethyl terephthalate, 396 ml. of ethylene glycol and 0.24 gram of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and ethylene glycol and form a polyester prepolymer. The prepolymer product was allowed to cool under an atmosphere of nitrogen.

EXAMPLE II

Fifty grams of the prepolymer product of Example I was mixed with 0.02 g. of dilithium ethylene diamine tetraacetate and placed in a reaction vessel. The reaction product was heated to about 280° C. under reduced pressure of from about 0.05 to about 0.01 mm. of mercury while under agitation for about three hours to bring about the polycondensation of the polyester prepolymer and formation of a polyester resin product. The resulting resin product had an intrinsic viscosity of 0.58, a carboxyl content value of 9.3 (meq./kg.) and a melting point of about 262° C. The polyester resin product was milky-white in color.

EXAMPLE III

Fifty grams of the prepolymer product of Example I was mixed with 0.02 g. of disodium lead ethylene diamine tetraacetate and placed in a reaction vessel. The reaction product was heated to about 280° C. under reduced pressure of from about 0.05 to about 0.01 mm. of mercury while under agitation for about three hours to bring about the polycondensation of the polyester prepolymer and formation of a polyester resin product. The resulting polyester resin product had an intrinsic viscosity of 0.62, a carboxyl content value of 10.2 (meq./kg.) and a melting point of about 261° C. The polyester resin product was milky-white in color.

EXAMPLE IV

Fifty grams of the prepolymer product of Example I was mixed with 0.02 g. of disodium zinc ethylene diamine tetraacetate and placed in a reaction vessel. The reaction product was heated to about 280° C. under reduced pressure of from about 0.05 to about 0.01 mm. of mercury while under agitation for about three hours to bring about the polycondensation of the polyester prepolymer and formation of a polyester resin product. The resulting polyester resin product had an intrinsic viscosity of 0.58, a carboxyl content value of 10.9 (meq./kg.) and a melting point of about 265° C. The resin product was milky-white in color.

EXAMPLE V

Fifty grams of the prepolymer product of Example I was mixed with 0.02 g. of mono-ferrous ethylene diamine tetraacetate and placed in a reaction vessel. The reaction product was heated to about 280° C. under reduced pressure of from about 0.05 to about 0.01 mm. of mercury while under agitation for about three hours to bring about the polycondensation of the polyester prepolymer and formation of a polyester resin product. The resulting polyester product had an intrinsic viscosity of 0.60, a carboxyl content value of 11.4 (meq./kg.) and a melting point of about 263° C. The resin product obtained had a milky-white color.

The intrinsic viscosities of the polyester resin products of the above examples were measured in a 60% phenol and 40% tetrachloroethane solution, wt./wt., at 30° C.

The carboxyl content values of the resin products of the above examples are based on equivalents per million grams of resin as determined by conventional laboratory procedures.

The resin products obtained in the above examples had suitably high molecular weights, low carboxyl content values, high melting points and especially good color, indicating that such resin products can be utilized in the manufacture of films, filaments and fibers that would have acceptable properties for commercial use.

The process of the present invention has been described with particular reference to polyethylene terephthalate, but it will be obvious that the subject invention includes within its scope other polymeric polymethylene terephthalates formed from glycols of the series $$HO(CH_2)_nOH$$

where $n$ is 2 to 10 and terephthalic acid esters and copolyesters containing varied amounts of other suitable esters of dicarboxylic acids, such as isophthalic acid.

We claim:
1. In a process of preparing polyethylene terephthalate wherein dimethyl terephthalate is reacted with ethylene glycol in the presence of an ester-interchange catalyst to form a polyester prepolymer and where the resulting polyester prepolymer is polycondensed, the improvement comprising carrying out the polycondensation of the polyester prepolymer in the presence of a catalytic amount of a metal salt of ethylene diamine tetraacetic acid polycondensation catalyst wherein the said salts are formed with metals selected from the group consisting of iron and metals from Groups IA, IIB, and IVA of the Periodic Table (Merck Index, sixth edition).

2. The process of claim 1 wherein the salt is present in an amount of from about 0.01% to about 0.2%, based on the weight of the polyseter prepolymer.

3. The process of claim 1 wherein the salt is dilithium ethylene diamine tetraacetate.

4. The process of claim 1 wherein the salt is disodium lead ethylene diamine tetraacetate.

5. The process of claim 1 wherein the salt is disodium zinc ethylene diamine tetraacetate.

6. The process of claim 1 wherein the salt is mono-ferrous ethylene diamine tetraacetate.

References Cited

UNITED STATES PATENTS

| | | | |
|---|---|---|---|
| 2,922,771 | 1/1960 | Coler | 260—31.2 |
| 3,060,152 | 10/1962 | Ringwald | 260—75 |
| 2,917,414 | 12/1959 | McLean. | |

WILLIAM H. SHORT, *Primary Examiner.*

LOUISE P. QUAST, *Assistant Examiner.*

U.S. Cl. X.R.

260—429.9, 435, 534